United States Patent
Morris et al.

(10) Patent No.: US 6,597,379 B1
(45) Date of Patent: Jul. 22, 2003

(54) AUTOMATED NAVIGATION TO EXCEPTIONAL CONDITION CELLS IN A MERCHANDISE PLANNING SYSTEM

(75) Inventors: Richard A. Morris, North Yorkshire (GB); Marc P. Skinner, Stow, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/396,251

(22) Filed: Sep. 15, 1999

(51) Int. Cl.⁷ .................................................. G09G 5/00
(52) U.S. Cl. ...................... 345/781; 345/809; 345/968; 707/4
(58) Field of Search ................................ 345/781, 803, 345/804, 808, 809, 810, 830, 853, 854, 968; 707/3–6

(56) References Cited

U.S. PATENT DOCUMENTS

| | | | |
|---|---|---|---|
| 5,299,115 A | | 3/1994 | Fields et al. |
| 5,371,675 A | * | 12/1994 | Greif et al. ................. 345/781 |
| 5,396,621 A | * | 3/1995 | MacGregor et al. ........ 345/809 |
| 5,664,127 A | * | 9/1997 | Anderson et al. ........... 345/776 |
| 5,796,932 A | | 8/1998 | Fox et al. |
| 5,832,456 A | | 11/1998 | Fox et al. |
| 5,841,659 A | | 11/1998 | Tanaka et al. |
| 5,854,746 A | | 12/1998 | Yamamoto et al. |
| 5,914,878 A | | 6/1999 | Yamamoto et al. |
| 6,057,837 A | * | 5/2000 | Hatakeda et al. ........... 345/708 |
| 6,075,530 A | * | 6/2000 | Lucas et al. ................. 345/804 |
| 6,317,750 B1 | * | 11/2001 | Tortolani et al. ........... 345/853 |

OTHER PUBLICATIONS

Screen Dumps of MicroSoft Access 97 Filtering Data Functions (pp. 1–9, 1997).*
Moseley et al. ("Mastering Microsoft Office 97", Chapter 22, pp. 557–580, 1997).*
Mastering MicroSoft Office 97 (pp. 317–321, 1997).*
Authors—Edward F. Watson and Randall P. Sadowski Title—Developing and Analyzing Flexible Cell Systems Using Simulation Publication Date—Winter, 1994 Relevant pp.—978–985.

* cited by examiner

Primary Examiner—Sy D. Luu
(74) Attorney, Agent, or Firm—Michael F. Hoffman; Hoffman, Warnick & D'Alessandro (57) ABSTRACT

A planning system for analyzing planning data, wherein the planning system includes a computer program that comprises a planning data window for displaying a view of the planning data; a definition system for defining exception criteria; a searching system for identifying exceptions in the planning data based upon the exception criteria; an exception dialog for displaying and selecting exceptions identified by the searching system; and a navigation system that allows a planner to navigate from exceptions listed in the exception dialog to and among the exceptions displayed in the planning data window. Exceptions located in the planning data window are annotated for easy recognition by the planner.

45 Claims, 7 Drawing Sheets

MAKORO [Store_Class]

| PLAN ... | | Store_Class | Store Class Plan | | Rule Group ... | | Get Data |
|---|---|---|---|---|---|---|---|
| PRODUCT | | 104 TOPS | | | LOCATION | INDABA INDABA INC | |

Store_Class: Public View Inventory $ Receipt Review (modified)

| WOVENS | ALL TIME | TRADING YEAR 99 | SPRING 99 | FALL 99 | M199908 | M199909 | M199910 | M199911 | M199912 |
|---|---|---|---|---|---|---|---|---|---|
| Bellingham | | | | | | | | | |
| BOP Dollars | 603 | 603 | 603 | 1,378 | 1,378 | 500 | 145 | 355 | 1,033 |
| Receipts Dollars | 59,022 | 59,022 | 5,289 | 53,733 | -247 | -71 | 777 | 1,821 | 51,453 |
| Sales Dollars | 7,693 | 7,693 | 3,732 | 3,981 | 550 | 132 | 402 | 914 | 1,963 |
| Reductions Dollars | 1,836 | 1,836 | 783 | 1,053 | 81 | 152 | 166 | 228 | 426 |
| EOP Dollars | 50,097 | 50,097 | 1,370 | 50,097 | 500 | 145 | 355 | 1,033 | 50,097 |
| Poughkeepsie | | | | | | | | | |
| BOP Dollars | 578 | 578 | 578 | 1,309 | 1,309 | 1,344 | 576 | 448 | 1,097 |
| Receipts Dollars | 40,192 | 40,192 | 5,018 | 35,173 | 635 | 0 | 670 | 1,734 | 32,127 |
| Sales Dollars | 8,072 | 8,072 | 3,544 | 4,527 | 523 | 624 | 649 | 860 | 1,864 |

| | | | | | | | |
|---|---|---|---|---|---|---|---|
| MAKORO [Store_Class] | | | | | | | |
| PLAN ... | | Store_Class Store Class Plan | | Rule Group ... | | Get Data | |
| PRODUCT | 104 TOPS | | | LOCATION | 2 BOP, Sales, SqFt INDABA INDABA INC | | |

Store_Class: Public View Inventory $ Receipt Review (modified)

| WOVENS | ALL TIME | TRADING YEAR 99 | SPRING 99 | FALL 99 | M199908 | M199909 | M199910 | M199911 | M199912 |
|---|---|---|---|---|---|---|---|---|---|
| Bellingham | | | | | | | | | |
| BOP Dollars | 603 | 603 | 603 | 1,378 | 1,378 | 500 | 145 | 355 | 1,033 |

ESP Exception Criteria List

| Code | Public | Name | | | 53,733 | −247 | −71 | 777 | 1,821 | 51,453 |
|---|---|---|---|---|---|---|---|---|---|---|
| Neg_Rec | + | Negative Receipts | | | 3,981 | 550 | 132 | 402 | 914 | 1,963 |
| | | | 74 | | 1,053 | 81 | 152 | 166 | 228 | 426 |

Selected ESP Criteria List

Neg_Rec + CLASS STORE TRAD_MONTH Negative Receipts

81

— Maintenance —
- New
- Edit
- Delete

— Selections —
- Clear All
- Select All
- Cancel

— Analysis —
- Find Exc  72

Begin Exceptions Search  80    Cancel

Exception Limit  1000

AUTOMATED NAVIGATION TO EXCEPTIONAL CONDITION CELLS IN A MERCHANDISE PLANNING SYSTEM

BACKGROUND OF THE INVENTION

1. Technical Field

The present invention relates to computerized planning systems, and more specifically, to an automated navigation system for displaying exceptional condition cells in a computerized planning system.

2. Related Art

Merchandise planning systems have become an important tool for successful business planning. Proper merchandise planning allows a business to purchase the right levels of merchandise, in the right assortments, for the right stores. When done correctly, stores have balanced inventories and customers find the products they want. When done incorrectly, stores are faced with clearance markdowns, unhappy customers, and unbalanced inventories. Accordingly, accurate merchandise planning can be the difference between profitability and unprofitability.

Specialized software programs that handle planning data are now available to facilitate merchandise planning. Merchandise planning software programs allows users to create, monitor, evaluate and adjust merchandising plans. At the heart of such programs are spreadsheets that display and analyze data. During planning sessions, users can study and manipulate data to, for example, plan for business needs, create "what-if" scenarios, and analyze performance.

One of the problems faced by users, however, is managing the volume of data available while in a planning session. A typical view of a planning data set may have hundreds of viewable pages of data. Accordingly, the data being viewed in any one page of data will by necessity be a small subset of the planning data. A typical planning session therefore can quickly become logistically burdensome since the planner is required to constantly switch between viewable pages. This problem is further aggravated by the fact that the same set of data can be viewed in many different ways. For example, data can be viewed within different dimensions (e.g., goods sold during given time periods, goods sold by different store locations, etc.) and at different levels of detail (e.g., goods sold by the month, goods sold by the week, etc.). Moreover, during a planning session, a planner may only be interested in analyzing a small set of data items spread out throughout the data set.

For example, planners often need to efficiently identify and deal with potentially problematic or exceptional data. Specifically, a user might want to know the months when shoe inventory will be projected to fall below a critical level. Once identified, the planner can take corrective action, e.g., ordering more inventory for those months. While present systems provide some basic tools for identifying exceptional data, there are no comprehensive tools that integrate identifying exceptional data within a planning session to increase efficiency. Without an easy way of navigating to the data items of interest, planning can become inefficient and time consuming.

SUMMARY OF THE INVENTION

The present invention addresses the above-mentioned problems by providing a system for analyzing planning data, wherein the planning system includes a computer program that comprises a planning data window for displaying a view of the planning data; a definition system for defining exception criteria; a searching system for identifying exceptions in the planning data based upon the exception criteria; an exception dialog for displaying exceptions identified by the searching system and for selecting one or more of the displayed exceptions; and a navigation system that allows a planner to navigate from exceptions listed in the exception dialog to and among the exceptions displayed in the planning data window. Furthermore, to facilitate the planning process, exceptions identified in the planning data are highlighted or annotated when they appear on pages in the planning data window.

The invention also includes a method for navigating to exceptions in a planning data window in a computerized planning system, comprising the steps of: defining exception criteria; searching planning data for exceptions based upon the exception criteria; displaying exceptions located during the search step; selecting a first one of the located exceptions; and displaying a first portion of the planning data in the planning data window, wherein the first portion of the planning data includes the first selected exception. The method further comprises the step of annotating a cell containing the first selected exception in the planning window to indicate that the cell contains one of the located exceptions.

It is therefore an advantage of the present invention to provide a planning system in which a planner can navigate to exceptions in the planning data from a dialog that lists identified exceptions.

It is a further advantage of the present invention to provide a planning system in which a planner can toggle through exceptions located within the planning data window.

It is a further advantage of the present invention to provide a planning system in which exceptions located within the planning data will be highlighted in the planning data window.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

Figure 1:
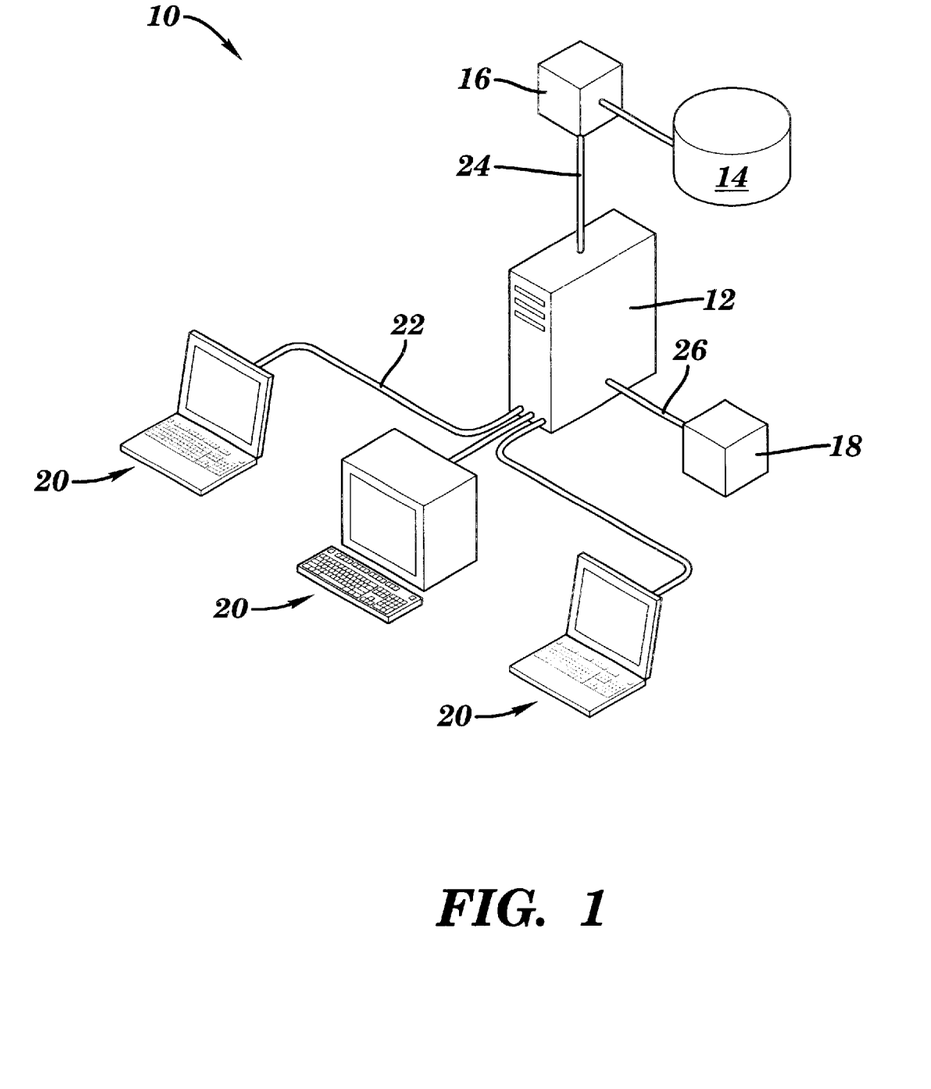
FIG. 1 depicts a planning system in accordance with a preferred embodiment of the invention.

Referring now to the figures, FIG. 1 depicts a computerized planning system 10. Planning system 10 comprises a planning engine server 12, a relational database 14, a data access engine 16, a plurality of client terminals 20, a planning data cube 18, and a plurality of communication links 22, 24 and 26. It should be recognized that although the system 10 is shown as a plurality of components, each or all of these components can reside within a single or distributed computer system. Client terminals 20 provide the user with an interface to access planning data and engage in a planning session. Planning data is stored in relational database 14, and is accessed by planning engine server 12 via data access engine 16 and communication link 24. Planning software, which is used to analyze and manipulate planning data, may reside on planning engine server 12 as well as client terminals 20. Planning data cube 18 comprises a subset of planning data that is utilized in a present planning session. It should be understood that each of the communication links 22, 24 and 26 may be implemented in any known manner, such as via a coaxial cable, phone wires, optical cable, wireless transmission, etc. Accordingly, each of the components may or may not reside in the same physical location.

The planning system 10 is generally described herein in terms of a merchandise planning system. However, it should be recognized that this invention covers any type of planning system, including inventory management, parts requirements, financial planning, etc. In addition, it is understood that one skilled in the art is familiar with planning software systems, such as Makoro™ sold by IBM Corporation.

Planning system 10 utilizes spreadsheets comprising cells of data to display planning data, with the amount of data often being enormous. In order to limit the amount of data processed in a planning session, a planner can define and create unique views of the planning data. A "view" is a sub-set of the planning data made available in a window on a computer screen. Although a view limits the amount of data being processed, a view still typically contains much more data than can be physically seen at one time in a window. To navigate within view, the planner can scroll or page through the data as needed. For the purposes of this invention, a "page" or "viewable page" may be defined as the data that is actually displayed in a window at a given point in time. A page therefore does not necessarily contain a predefined set of information, but rather, contains what is currently viewable within a window.

To create views, one or more plan formats may be used as templates to define and limit the type and level of detail (e.g., merchandise data) that is to be depicted in a plan. One or more "views" may then be associated with each plan format. For example, a planner may define a plan format. "Store Planning" and three plans, "'original,'" "'working,'" and "'approved." A view may then be created called "Step 1: Plan Sales Growth Last Year," which contains three variables, "Sales," "Last Year Sales," and "Sales Percentage Last Year." This view can be used from any of the plans that are of the "Store Planning" plan format. The definition of a view is independent of the data that it shows, and a planner does not have to create more than one plan format to open more than one view. A second view for the "Store Planning" plan format can be created called "Step 2: Plan Square footage," which shows a different set of variables, e.g., "Sales," "'Square Footage," and "Sales per Square Foot" to be displayed. The second view can also be used from any plan that is of the plan format "Store Planning."

The logical contents of a view is associated with a plan format. The plan format will determine which cells may appear in the view, thereby allowing an organization to define the types and level of detail required. In addition, any number of plan formats can be created to allow for more than one open view of the planning data during the planning process. Any particular cell may therefore be: (1) currently visible on a view (i.e., displayed on a page in a window); (2) available for viewing on a view, but not currently visible on the displayed page (i.e., to see the cell you need to scroll); or (3) not available on a view (i.e. to see the cell you need to redefine the view). The navigation mechanisms described herein allow the planner to navigate directly to cells in any of the three states described above, including those for which the view needs to be redefined. These mechanisms are described in more detail below.

Figure 2:
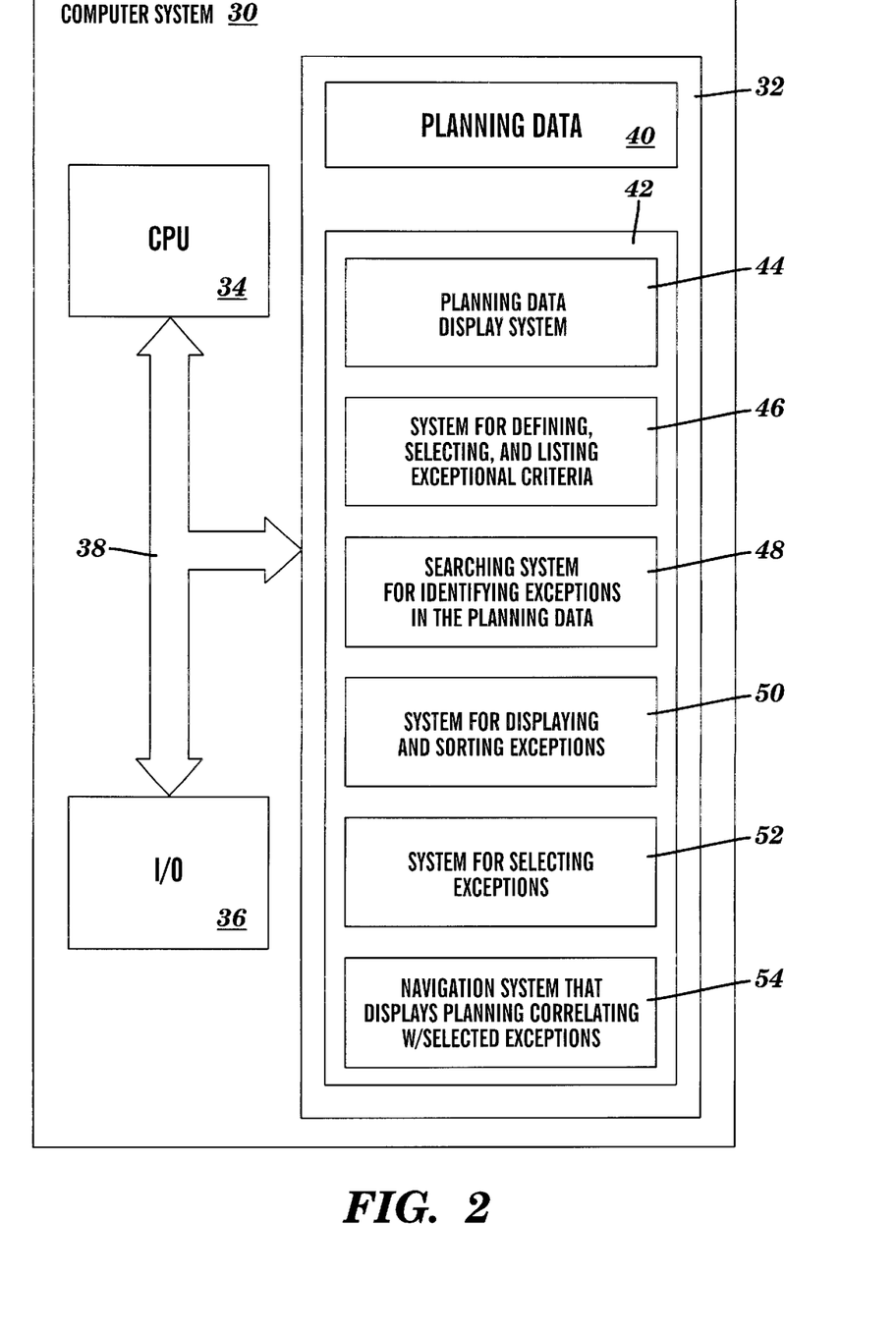
FIG. 2 depicts a computer system and program in accordance with a preferred embodiment of the invention.

Referring now to FIG. 2, a computer system 30 is depicted that comprises memory 32, a central processing unit (CPU) 34, input output (I/O) 36, and bus 38. Memory 32 may comprise any known type of data storage and/or transmission media, including magnetic media, optical media, random access memory (RAM), read only memory (ROM), a data object, etc. Moreover, memory 32 may reside at a single physical location, comprising one or more types of data storage, or be distributed across a plurality of physical systems in various forms. CPU 34 may likewise comprise a single processing unit, or be distributed across one or more processing units in one or more locations, e.g., on a client and server. I/O 36 may comprise any known type of input output device, including keyboard, mouse, voice, CRT, printer, disk drives, etc. Bus 38 provides a communication link between each of the components in the computer system 30 and likewise may comprise any known type of transmission link, including electrical, optical, radio, etc. In addition, although not shown, additional components, such as cache memory, communication systems, etc., may be incorporated into computer system 30.

Memory 32, comprises planning data 40 and planning software 42. Planning data 40 contains all of the data required for a planning session. Planning data 40 may comprise any type of data necessary for a business to plan for future requirements. For example, planning data 40 may comprise projected sales figures, inventory requirements, and financial information for a chain of retail clothing stores for an upcoming year. Planning data 40 may be stored in a relational database such as those sold under the trade names of DB/2™ or Oracle™, where it can be read by planning software 42.

Planning software 42 comprises a planning data display system 44, a system for defining, selecting, and listing exception criteria 46, a searching system for identifying exceptions in the planning data 48, a system for displaying and sorting exceptions 50, and a navigation system that correlates planning data 40 with selected exceptions 52. Each of these components will be described in more detail below in FIGS. 3–7. Planning software 42 may comprise any type of computer executable code suitable for, or transformable into code suitable for, execution on computer system 30. Planning software 42 may utilize any known methods for displaying information and interacting with an end user or planner. The present invention can also be embedded in a computer program product, which comprises all the features enabling the implementation of the methods described herein, and which—when loaded in a computer system—is able to carry out these methods. In this preferred embodiment, planning software 42 utilizes a graphical user interface (GUI) that includes windows and dialogs, as commonly used in the art. Nonetheless, the terms GUI, windows, and dialogs, as used in this invention, should be given the broadest possible interpretation and include any system for displaying and interfacing with an end user. Thus, for example, a dialog may include a pop-up window, an area on an existing screen for displaying and capturing information, an external device for inputting and outputting data, a voice recognition system, etc.

Figure 3:
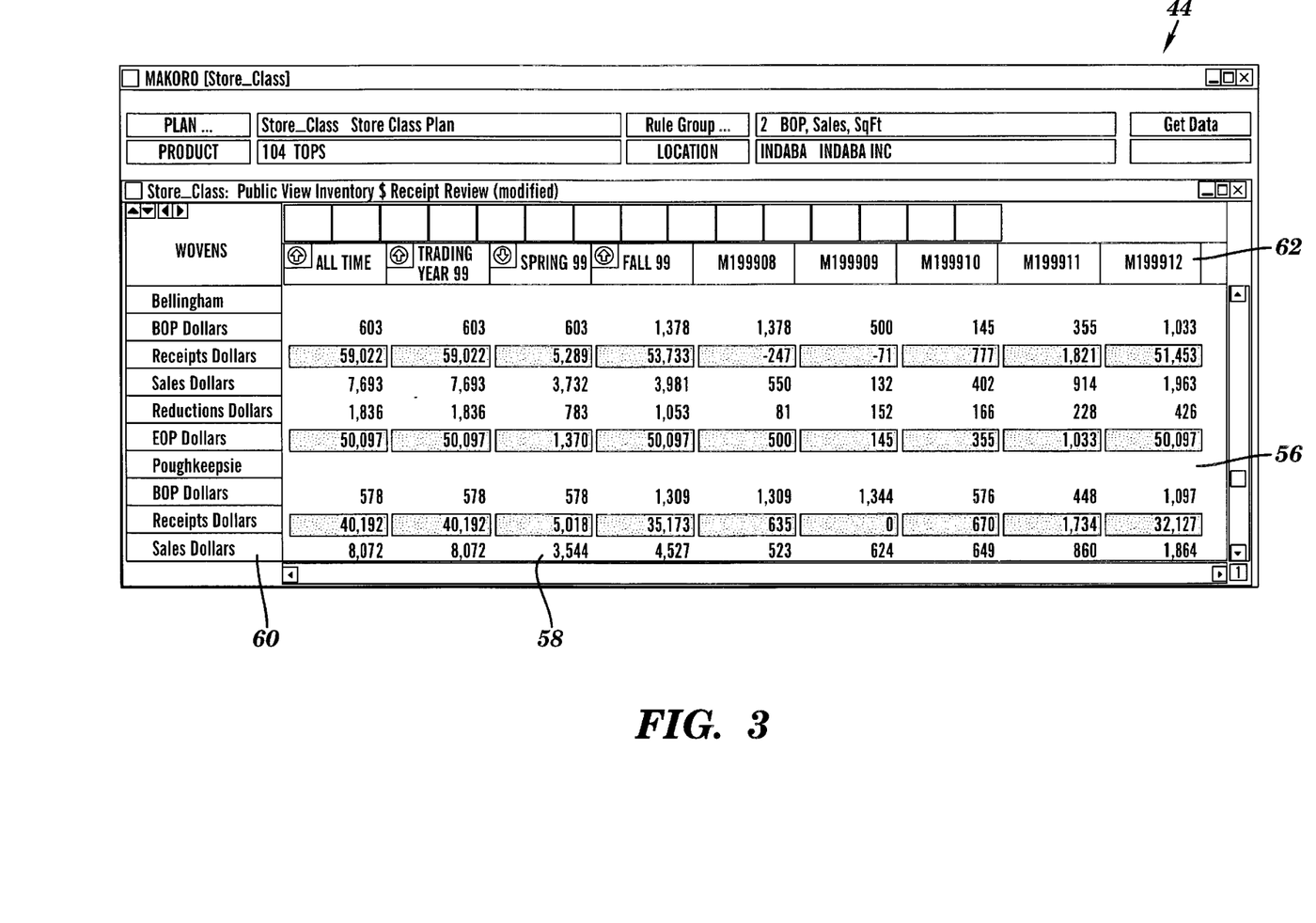
FIG. 3 depicts a display window displaying planning data in accordance with a preferred embodiment of the invention.

Referring now to FIG. 3, a GUTI is depicted comprising a planning data display system 44. Planning data display system 44 comprises one or more "planning data windows," each depicting a particular view of planning data in a predetermined manner, such as spreadsheet 56. The particular example shown depicts a single view having dollar amount categories by location on the vertical axis 60 and time categories on the horizontal axis 62. The data for specific dollar categories at given time frames are displayed on the spreadsheet in cells, with each cell containing a unique data item. For example, the Sales Dollars for Wovens in Poughkeepsie during SPRING 99 is shown in cell 58 as 3,544.

Because the amount of data involved in a particular view is generally much greater than can be displayed in a single window, the planner can navigate to different viewable pages of data by using scrolling commands such as page up/down or the like. In addition, because planning data 40 may be displayed in different views, the planner can navigate between views simply by changing windows. For example, an additional view (and therefore window) in the example shown in FIG. 3 might display projected monthly inventory requirements for various stores.

One of the goals of this planning system is to identify, navigate to, and deal with exceptional conditions during a planning session. "Exceptional conditions" or "exceptions" are defined as data items in the planning data that may require special attention by a planner. Although exceptional conditions, or exceptions, are typically associated with problematic data, it is understood that exceptional conditions may comprise any data that meets some defined criteria. For example, exceptional conditions may be defined as months where a store shows a negative profit, or alternatively, as months where a store exceeds a threshold profit. Moreover, "special exceptions" that assist the planner in navigation during the planning process may also be used within the system. Special exceptions deal with the status of a cell during a planning session, as opposed to whether the data contained within the cell meets some planning criteria. For example, a cell that contains data that has been changed during the planning session may be tracked as a special exception. Additional examples of special exceptions are discussed below with regard to FIG. 6.

Figure 4:
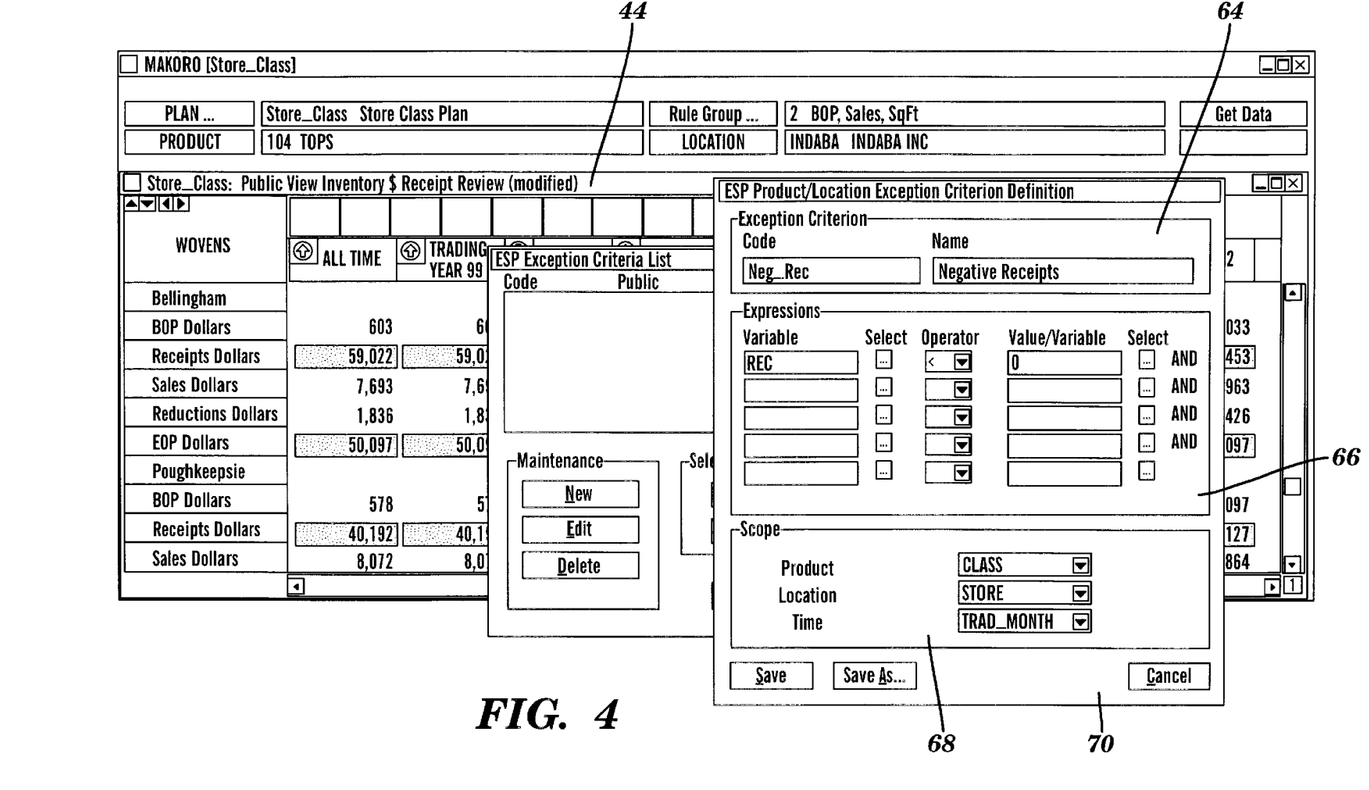
FIG. 4 depicts a definition system for defining exception criteria in accordance with a preferred embodiment of the present invention.

Referring to FIG. 4, a system for creating exceptions and defining exception criteria is depicted in the form of a definition dialog 70. Exceptions may be defined by a name and code 64, one or more expressions 66, and a scope 68. Exception criteria may be defined by a planner or an administrator, with the system supporting security levels if necessary, e.g., public and private exception criteria.

As noted, exception criteria are given both a code and a name. The code represents a unique identifier (i.e., database key) while the name represents a user friendly description of the exception criteria. The definition dialog 70 (launched by the New button on the exception criteria list dialog, FIG. 5) allows exception criteria to be quickly and easily defined. A simple exception criterion is a single expression which compares between two values, either a variable and a constant, or two variables. In FIG. 4, the exception criterion has the name "Negative Receipts," code "Neg$_{13}$ Rec," and expression "REC <0." Accordingly, the code Neg_Rec has a criterion that will look for all data in which receipts are negative.

Other valid exception criteria might include "Sales <10000," "SalesPrice<CostPrice," etc. More complex criteria can be built using boolean logic, e.g., by "ANDing" together single expressions. Accordingly, a criterion that includes "StockSlsRatio>15 AND Stock >1000" will only flag as exceptions those cells where the stock-to-sales ratio is too high (greater than 15) and there is a significant quantity of stock (over 1000). ANDing expressions is achieved by providing multiple expressions within the definition dialog 70.

Each exception criterion also has a "scope" defined indicating the levels in the product and/or location and time dimensions where the check for an exception is to be made. This is useful because exceptions may only be applicable at certain levels. For example, a stock-to-sales ratio of 10 may be perfectly acceptable at the weekly level, but a disaster at a monthly level.

When a user with administration rights saves an exception criterion, the system prompts to find out whether the criterion is to be public or private. Public exception criteria are, like public views, saved against a plan format, and thus are available to all planners for all plans of that format.

Figure 5:
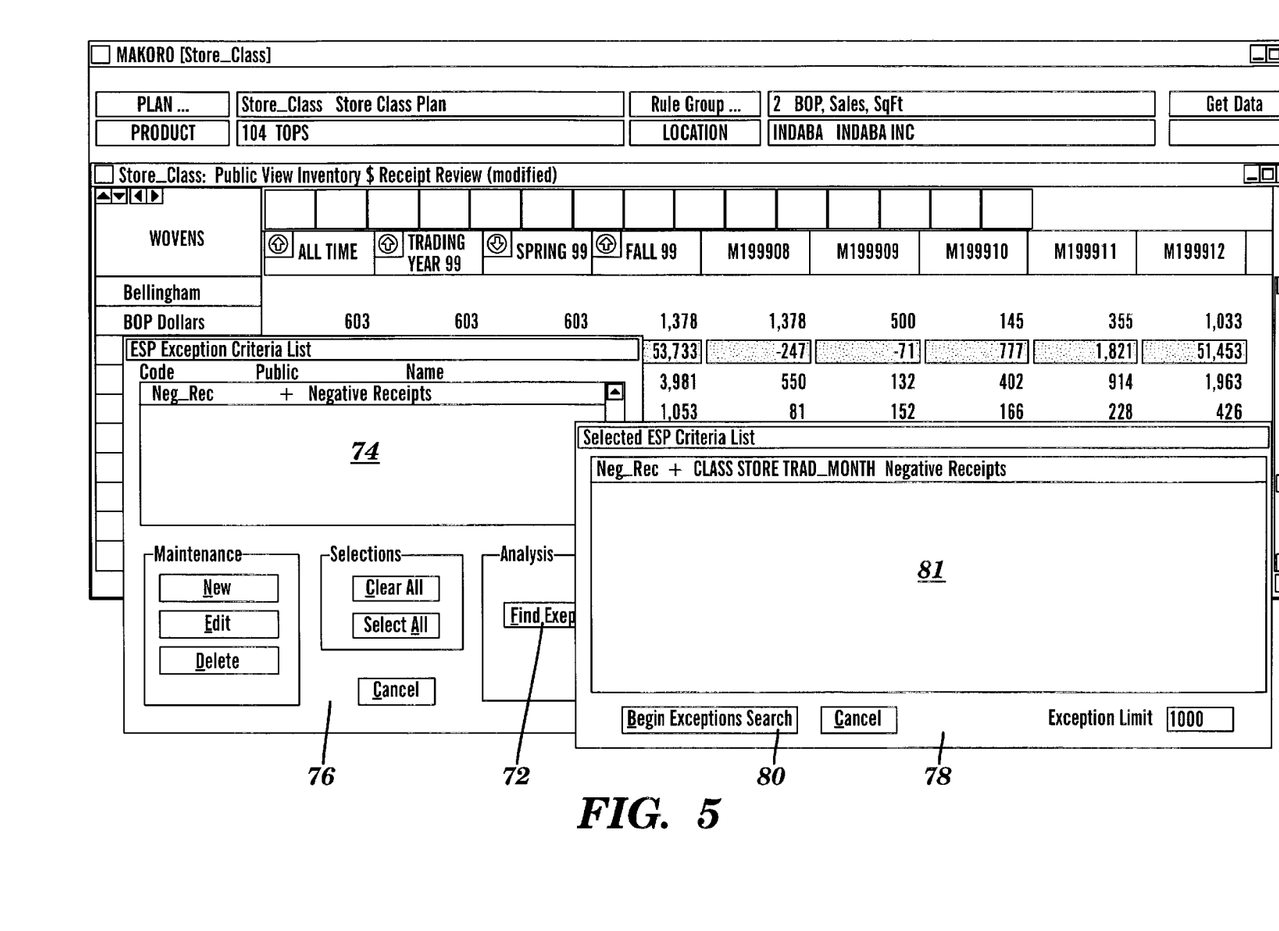
FIG. 5 depicts a system for listing exception criteria and selected exception criteria in accordance with a preferred embodiment of the present invention.

Referring now to FIG. 5, exception criteria list dialog 76, as well as selected criteria list dialog 78, are depicted and contain information relating to the exception defined in the example of FIG. 4. The exception criteria list dialog 76 provides a system for selecting from one or more defined exception criteria as depicted in window 74, and for launching a search for exceptions in the planning data, via the Find Exception button 72. Selections may be made using the Select All/Clear All buttons, and/or by manipulating the cursor with keyboard keys or a mouse, etc. If the particular exception criterion required is not present on this menu, the planner may use the New button in the maintenance section of the dialog to define a new exception criterion (as described with reference to FIG. 4). Once the definition is complete, the exception criterion will appear in window 74, already selected. From this dialog, the planner may also edit or delete personal exception criteria, or public exception criteria if the planner has administrative rights.

Within the exception criteria list dialog 76, the planner may select one or more exception criteria, through the use of normal windowing techniques, such as Shift-Select or Ctrl-Select, and the use of the Clear All and Select All buttons. When the required exception criteria have been selected, the planner may press the Find Exceptions button 72. In the current example, only one criterion, "Neg_Rec," has been defined in window 74. If additional criteria were defined, multiple selections could be made. Note that selecting more than one exception criterion effectively supports "OR" ing exception criteria together.

The selected criteria list dialog 78 includes a window 81 that lists those exception criteria that were selected by the planner in the exception criteria list dialog 76. In the example shown, "Neg_Rec" is the only selected criterion. The selected criteria list dialog 80 also allows the planner to initiate a search for exceptions, via the Begin Exception Search button 80. Also, the planner may limit the number of exceptions returned by setting an exception limit in this dialog.

When a search is launched, the system checks the data currently held in the planning engine for the selected exception criteria and builds a list of cells (e.g., Product and/or Location by Variable by Time) that have exceptions. Note that where the exception expression refers to more than one variable (e.g. "SalesPrice<CostPrice") all variables referenced in the expression may be flagged as exceptions, since the system cannot determine which cell is "wrong." If several exception criteria are being checked at the same time, the same cell may appear in the list of exceptions more than once. During this process, a dialog box keeps the planner informed about the number of units-of-work (all variables and time periods for a product and/or location) processed, and the number of exceptions found.

Figure 6:
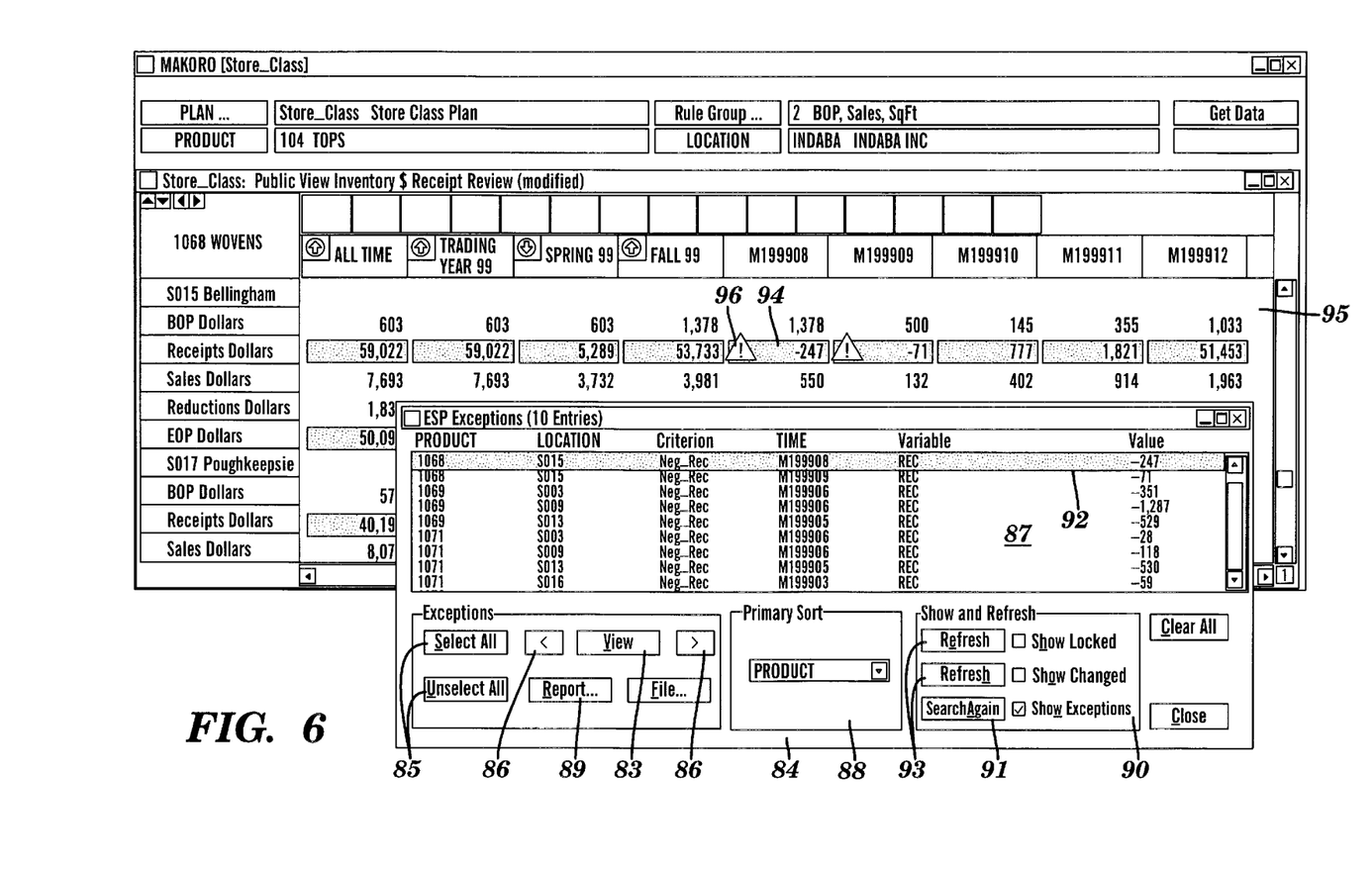
FIG. 6 depicts an exception dialog with a first selected exception in accordance with a preferred embodiment of the present invention.

When the system has finished finding exceptions, as shown in FIG. 6, it returns an exceptions dialog 84 that displays exceptions that meet the pre-selected criteria (in this case, negative receipts at the class, store, and month level). Exceptions dialog 84 includes a window 87 for displaying found exceptions, toggle keys 86 for toggling through found exceptions, a sorting system 88 for sorting the found exceptions, and buttons for selecting 85, viewing 83, reporting on 89 and saving to a file found exceptions. Exceptions dialog 84 also includes a show and refresh system 90 that allows a planner to initiate a new search 91, and/or cause locked or changed cells to become listed as exceptions. Thus, from exceptions dialog 84, the planner may navigate directly to a specific exception, re-sequence (i.e., sort) the list of exceptions, generate an exception print, produce a file of exceptions, view locked or changed cells, or clear the exceptions. Exceptions dialog 84 includes a sorting system 88 that enables the planner to view the exceptions in any number of different sort sequences. For example, a sort sequence may comprise a sort by Product, Location, Exception, Time, Variable, Value, etc.

To navigate to a specific exception, the planner sorts the list of exceptions into an appropriate sequence, selects the required exception, and presses the View button 83. This immediately positions every open spreadsheet view to a page containing the exception. Thus, for the case where the exception resides in a cell that is currently visible on a page on a view on the screen, no actual "repositioning" of the spreadsheet view is necessary. For the case where the exception resides in a cell that is within a view, but not currently visible on a page, the spreadsheet view will be automatically repositioned to a new viewable page that contains the exception. Finally, for the case where the exception resides in a cell that is not within a view, the system may reformat the view to include the cell containing the exception. For example, different levels of hierarchical detail may automatically be opened up if necessary for viewing the exception. This can, for instance, be implemented by drilling down dimensions (for dimensions in a parent-child presentation) or changing levels (for dimensions in flat presentation) and repositioning rows and columns on the screen as appropriate. For example, an open view may just show a number of departments, e.g., Mens, Ladies, etc. However, because each department may be made up of a number of classes, "drilling down" on the Ladies Department would show on the view, in addition to the departments, the classes in the Ladies Department (Ladies dresses, Ladies blouses, Ladies trousers, etc). Accordingly, if the exception resided at the class level, as opposed to the department level, the view could be reformatted to include the classes.

In the example depicted in FIG. 6, the first entry 92 has been selected, which causes the open spreadsheet view 95 to display the page that includes the cell 94 containing the selected exception. Each cell that appears in the list of current exceptions that is on the displayed spreadsheet 95, including the cell 94 corresponding to the selected exception 92, will be annotated with a special exclamation symbol 96 so that it can be readily found. Any other open spreadsheet views (not shown) that include current exceptions will likewise include a special exclamation symbol 96. While this implementation utilizes an exclamation symbol 96 to identify an exception, it is understood that any other type of mark or annotation could be used, e.g., highlighting, asterisk, etc.

A "next exception/previous exception" toggling facility 86 allows the planner to navigate back and forth through the list of exceptions. This facility may be implemented in other ways, such as with accelerator keys F3 and Shift-F3, which may be active even when the exceptions dialog 84 is not open. This functionality enables a planner to quickly process through all the exceptions, viewing each in context (i.e., as cells in a spreadsheet) and taking the appropriate action.

As mentioned above, exceptions dialog 84 can also be used to list the cells that have the status of locked (cannot be changed) or changed (recently modified). Locked or changed cells appear in the list as "special exceptions," and their display may be switched on and off via check boxes 90 in exceptions dialog 84. This handy aid enables planners to quickly locate cells that have been locked or changed (since the View and Next/Previous functions work on these "exceptions") and may be especially useful when a planner neglects to unlock cells when a planning task has been finished, and then subsequently forgets which cells were locked.

In this preferred embodiment, the list of exceptions (including the special exceptions) reflects the list built the last time that exceptions were searched. The list is not reset by a calculation, even though the calculation may have changed the values for some cells so that they are no longer exceptions. This is to allow an exception action policy which takes appropriate action for some exception cells, issues a calculate, checks the results, and then moves on to the next exception(s). At any time the planner may force another check of the same exception criteria by pressing the Search Again button 91 on the exceptions dialog 84. Similarly the list of locked or changed cells may be refreshed by pressing the appropriate Refresh button 93.

The Clear All button on the exception results dialog clears out the list of exceptions (but not the "special" locked and changed exceptions). Note that this is different from the option to not show the exceptions on a view 90. When the exception indicator is not shown on a view, the list of exceptions still contains the exceptions, and thus the reporting and output filtering processes will still have exceptions to work from. Once the list of exceptions is cleared, it is as if the last Find Exceptions found none. The only way to reconstitute a list of exceptions is to launch another search. Some planners may wish to use the Clear All button when they have done some exception checking in the current session, but are no longer concentrating on the exceptions. The exception indicator will continue to be shown on views if the list of exceptions is not cleared.

As noted, the exceptions dialog also comprises a reporting mechanism 89 that will generate reports containing only information involving exceptional data. Given the volume of data involved, this ability to generate such a limited report is of particularly great value.

Figure 7:
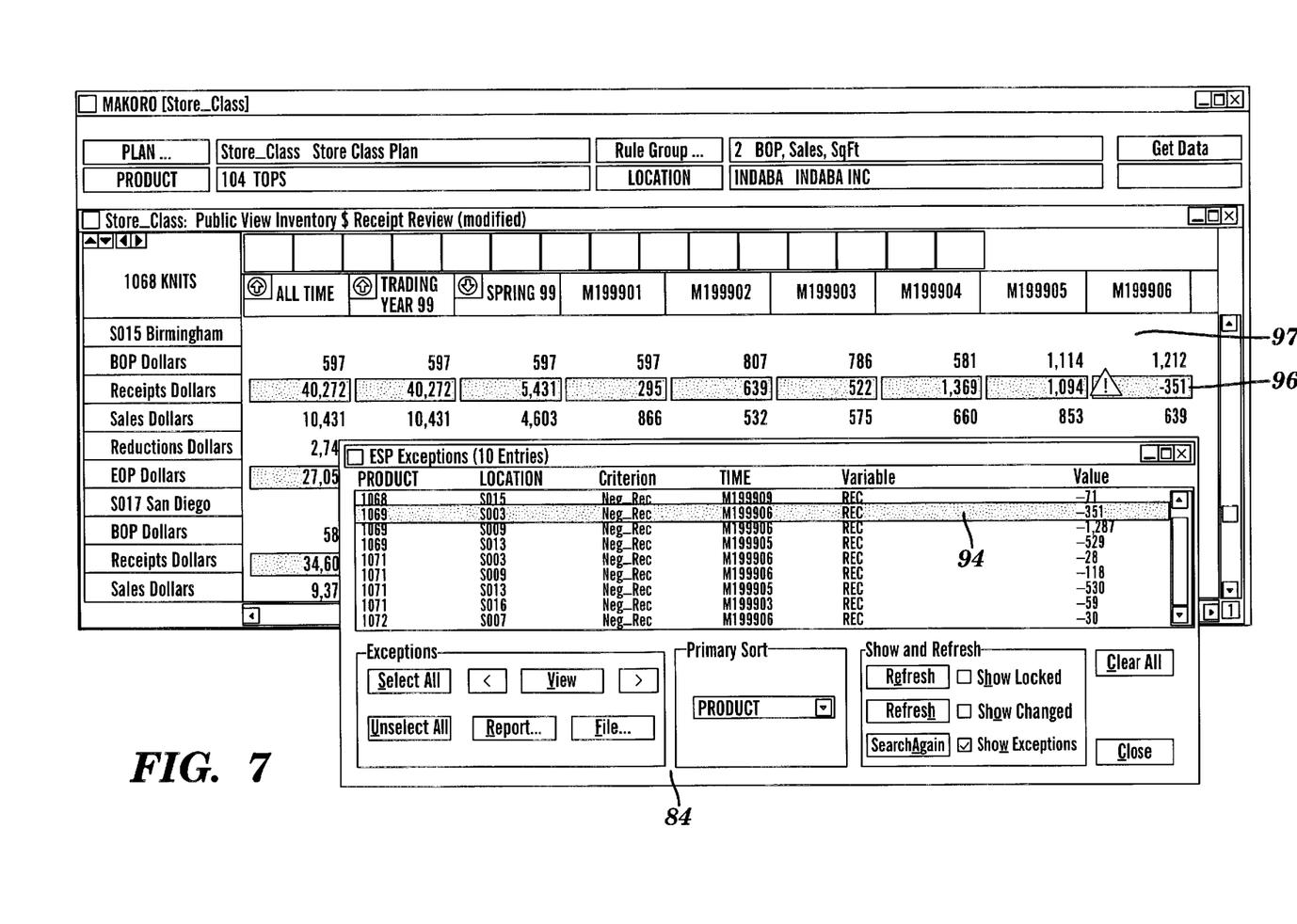
FIG. 7 depicts the exception dialog of FIG. 6 with a second selected exception in accordance with a preferred embodiment of the present invention.

Referring to FIG. 7, the dialog box 84 of FIG. 6 is shown with the second exception 94 selected. Since the exception was not previously displayed on the spreadsheet page 95 (FIG. 6), a new spreadsheet page 97 gets displayed that includes the cell 96 corresponding to the selected exception 94. Accordingly, the exception dialog 84 provides an easy and powerful system for navigating to exceptions.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

We claim:

1. A program product having computer readable code stored on a recordable media for analyzing planning data, the program product comprising:
   a planning data window for displaying a view of the planning data;
   a definition system for defining an exception criterion, wherein the exception criterion includes at least one data comparison operation involving the planning data;
   a searching system for identifying exceptions in the planning data based upon the exception criterion;
   an exception dialog for displaying exceptions identified by the searching system, and for selecting a displayed exception; and
   a navigation system for automatically displaying a page of the planning data in the planning data window containing the exception selected in the exception dialog.

2. The program product of claim 1, wherein the planning data window displays planning data in a plurality of cells within a spreadsheet.

3. The program product of claim 2, wherein the planning data window includes a system for annotating cells that meet the selected exception criterion.

4. The program product of claim 3, wherein the system for annotating cells places an exclamation mark within the cells that meet the selected exception criterion.

5. The program product of claim 1, wherein the definition system comprises a definition dialog in which an expression that compares values can be defined.

6. The program product of claim 5, wherein the definition dialog allows a scope to be defined.

7. The program product of claim 1, further comprising an exception criteria list dialog that lists defined exception criteria.

8. The program product of claim 1, further comprising a selected exception criteria list dialog that lists selected exception criteria.

9. The program product of claim 8, wherein the searching system can be launched from the selected exception criteria list dialog.

10. The program product of claim 1, wherein the searching system can be launched from the exception dialog.

11. The program product of claim 1, wherein the exception dialog comprises a sorting mechanism to sort the identified exceptions.

12. The program product of claim 1, wherein the exception dialog comprises a toggling mechanism for sequentially selecting displayed exceptions.

13. The program product of claim 1, wherein the exception dialog comprises a system for treating changed and locked planning data as exception data.

14. The program product of claim 1, further comprising a plurality of planning data windows for displaying a plurality of views of the planning data.

15. The program product of claim 14, wherein for each planning data window, the navigation system displays the page of the planning data that contains selected exception.

16. A computer system for analyzing planning data, the computer system comprising:
   a processing unit;
   a computer system memory accessible to the processing unit;
   planning data stored on the computer system memory; and
   a planning program stored on the computer system memory, wherein the planning program comprises:
      a planning data window for displaying a view of the planning data;
      a definition system for defining an exception criterion;
      a searching system for identifying exceptions in the planning data based upon the exception criterion;
      an exception dialog for displaying exceptions and associated planning data identified by the searching system and for selecting a displayed exception; and
      a navigation system that automatically displays a page of the planning data in the planning data window that contains the exception selected in the exception dialog.

17. The computer system of claim 16, wherein the planning data window displays planning data in a plurality of cells within a spreadsheet.

18. The computer system of claim 17, wherein the planning data window includes a system for annotating cells that meet the selected exception criterion.

19. The computer system of claim 18, wherein the system for annotating cells places an exclamation point within cells that meet the selected exception criterion.

20. The computer system of claim 16, wherein the definition system comprises a definition dialog in which an expression that compares values can be defined.

21. The computer system of claim 20, wherein the definition dialog allows a scope to be defined.

22. The computer system of claim 16, further comprising an exception criteria list dialog that lists defined exception criteria.

23. The computer system of claim 16, further comprising a selected exception criteria list dialog that lists selected exception criteria.

24. The computer system of claim 23, wherein the searching system can be launched from the selected exception criteria list dialog.

25. The computer system of claim 16, wherein the searching system can be launched from the exception dialog.

26. The computer system of claim 16, wherein the exception dialog comprises a sorting mechanism to sort the identified exceptions.

27. The computer system of claim 16, wherein the exception dialog comprises a toggling mechanism for sequentially selecting displayed exceptions.

28. The computer system of claim 16, wherein the exception dialog comprises a system for treating changed and locked planning data as exception data.

29. The computer system of claim 16, further comprising a plurality of planning data windows for displaying a plurality of views of the planning data.

30. The computer system of claim 29, wherein the navigation system displays the page of the planning data that correlates to the selected exception in each planning data window.

31. A method for navigating to exceptions in a planning data window in a computerized planning system, comprising the steps of:
   defining exception criteria;

searching planning data for exceptions based upon the exception criteria;

displaying exceptions and associated planning data located during the search step in an exception-dialog;

selecting a first one of the located exceptions in the exception dialog; and displaying a first portion of the planning data in the planning data window, wherein the first portion of the planning data includes the first selected exception, and wherein the exception dialog remains visible.

32. The method of claim 31, further comprising:

selecting a second one of the located exceptions in the exception dialog; and displaying a second portion of the planning data in the planning data window, wherein the second portion of the planning data includes the second selected exception.

33. The method of claim 31, further comprising the step of annotating a cell containing the first selected exception in the planning window to indicate that the cell contains one of the located exceptions.

34. The method of claim 31, further comprising the steps of:

displaying a second planning data window containing an alternate view of the planning data; and displaying planning data in the second planning data window that includes the selected first exception.

35. A graphical user interface in a computer based planning system, comprising:

a computer database having planning data stored therein;

a planning data window for displaying a page of the planning data;

a definition dialog for defining an exception criterion, wherein the exception criterion includes at least one data comparison operation involving the planning data;

a searching system for identifying exceptions in the planning data based upon the exception criterion;

an exception dialog for displaying exceptions and associated planning data identified by the searching system, and for selecting one of the displayed exceptions; and a navigation system that displays the page of the planning data in the planning data window that contains the selected exception.

36. The graphical user interface of claim 35, wherein the exception dialog includes a sorting mechanism for sorting exceptions.

37. The graphical user interface of claim 35, wherein the exception dialog includes a toggling mechanism for sequentially selecting displayed exceptions.

38. The graphical user interface of claim 35, wherein a data item in the planning data window can be changed, and wherein the exception dialog includes a mechanism for defining the changed data item as an exception.

39. The graphical user interface of claim 35, wherein a data item in the planning data window can be locked, and wherein the exception dialog includes a mechanism for defining the locked data item as an exception.

40. The graphical user interface of claim 35, wherein planning data window includes an annotation next to each data item identified as an exception.

41. A program product having computer readable code stored on a recordable media for analyzing planning data, the program product comprising:

a planning data window for viewing a logical view of the planning data, wherein the logical view is associated with a plan format and comprises a plurality of cells each containing a data item;

a scrolling system for moving to different pages of the logical view of the planning data;

an exception dialog for listing data items from the planning data that meet a predefined exception- criterion; and a navigation system for selecting one of the listed data items in the exception dialog, and for automatically causing the planning data window to display the cell containing the selected data item.

42. The program product of claim 41, wherein the navigation system causes the logical view of the planning data to automatically scroll from an existing page to a new page in order to display the cell containing the data item.

43. The program product of claim 41, wherein the navigation system causes the logical view of the planning data to automatically drill down hierarchies in order to display the cell containing the data item.

44. The program product of claim 41, wherein the navigation system causes a second logical view of the planning data to automatically scroll from an existing page to a new page in order to display the cell containing the data item.

45. The program product of claim 41, wherein the navigation system causes the planning data window to annotate the cell containing the data item which meets the predefined exception criterion.

* * * * *

UNITED STATES PATENT AND TRADEMARK OFFICE
CERTIFICATE OF CORRECTION

PATENT NO.    : 6,597,379 B1
DATED         : July 22, 2003
INVENTOR(S)   : Morris et al.

It is certified that error appears in the above-identified patent and that said Letters Patent is hereby corrected as shown below:

Column 5,
Line 6, delete "GUTI" and insert -- GUI --.

Signed and Sealed this

Seventh Day of October, 2003

JAMES E. ROGAN
*Director of the United States Patent and Trademark Office*